(12) United States Patent
Sundholm

(10) Patent No.: US 9,339,983 B2
(45) Date of Patent: May 17, 2016

(54) METHOD AND APPARATUS FOR HANDLING MATERIAL IN A PNEUMATIC MATERIALS HANDLING SYSTEM

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 560 days.

(21) Appl. No.: 13/578,386

(22) PCT Filed: Feb. 8, 2011

(86) PCT No.: PCT/FI2011/050111
§ 371 (c)(1),
(2), (4) Date: Aug. 10, 2012

(87) PCT Pub. No.: WO2011/098669
PCT Pub. Date: Aug. 18, 2011

(65) Prior Publication Data
US 2012/0319327 A1    Dec. 20, 2012

(30) Foreign Application Priority Data

Feb. 12, 2010   (FI) .................................... 20105145
May 12, 2010   (FI) .................................... 20100203
May 24, 2010   (FI) .................................... 20105570

(51) Int. Cl.
*A47L 9/16*    (2006.01)
*B30B 15/30*    (2006.01)
(Continued)

(52) U.S. Cl.
CPC ................. *B30B 15/30* (2013.01); *B30B 13/00* (2013.01); *B65F 5/005* (2013.01); *B65G 51/02* (2013.01);
(Continued)

(58) Field of Classification Search
CPC .... B65F 5/00; B02C 18/0084; B02C 18/0092
See application file for complete search history.

(56) References Cited

U.S. PATENT DOCUMENTS 2,761,627 A * 9/1956 Reed ......................... 241/46.013
3,621,774 A    11/1971 Dedio et al.
(Continued)

FOREIGN PATENT DOCUMENTS

CN    101730590 A    6/2014
DE    2504212 A1    8/1976
(Continued)

OTHER PUBLICATIONS

Notification of Reason for Refusal dated Jan. 29, 2015 issued in corresponding Japan Application No. 2012-552438 (with English translation).
(Continued)

*Primary Examiner* — Galen Hauth
(74) *Attorney, Agent, or Firm* — Birch, Stewart, Kolasch & Birch, LLP

(57) ABSTRACT

Method for handling material in a pneumatic materials handling system, in which material is input from an input aperture of an input point and is handled with a shaping device, arranged in connection with the input point or in the proximity of it, to be more compact and is transferred onwards, which shaping device is a rotary shaper, which includes a rotatable handling device, which includes an aperture, which is arranged eccentrically with respect to the axis of rotation, and which rotary shaper includes at least one stationary handling device, in which case the material to be handled is conducted into the rotary shaper and/or through it at least partly by means of gravity. The material to be handled is conducted into the rotary shaper and/or through it at least partly by means of suction and/or a pressure difference.

29 Claims, 5 Drawing Sheets

(51) Int. Cl.
*B65G 51/02* (2006.01)
*B65F 5/00* (2006.01)
*B30B 13/00* (2006.01)
*B65G 53/16* (2006.01)
*B65G 53/48* (2006.01)
*B02C 18/00* (2006.01)

(52) U.S. Cl.
CPC ............. *B65G 53/16* (2013.01); *B02C 18/0084* (2013.01); *B02C 18/0092* (2013.01); *B65G 53/48* (2013.01)

(56) References Cited

U.S. PATENT DOCUMENTS

| | | |
|---|---|---|
| 4,630,780 A | 12/1986 | Immel et al. |
| 2007/0294858 A1* | 12/2007 | Murphy ........................... 15/353 |

FOREIGN PATENT DOCUMENTS

| | | |
|---|---|---|
| FI | 74655 B | 11/1987 |
| JP | 61-153149 A | 7/1986 |
| JP | 63-162050 A | 7/1988 |
| JP | 63-133505 U | 9/1988 |
| JP | 11-28380 A | 2/1999 |
| JP | 2002-85997 A | 3/2002 |
| WO | WO 82/03200 A1 | 9/1982 |
| WO | WO 01/21315 A1 | 3/2001 |
| WO | 2008/138069 A1 | 11/2008 |
| WO | WO 2009/130374 A1 | 10/2009 |

OTHER PUBLICATIONS

Office Action issued in corresponding CN Application No. 201180014861.X on Nov. 18, 2015 and English translation thereof.

* cited by examiner

METHOD AND APPARATUS FOR HANDLING MATERIAL IN A PNEUMATIC MATERIALS HANDLING SYSTEM

BACKGROUND OF THE INVENTION

The invention relates generally to materials handling systems, such as partial-vacuum conveying systems, more particularly to the collection and moving of wastes, such as to the moving of household wastes.

Systems wherein wastes are moved in piping by means of an air current produced by a pressure difference and/or suction are known in the art. In these, wastes are moved long distances in the piping. It is typical to these systems that a partial-vacuum apparatus is used to bring about a pressure difference, in which apparatus a partial vacuum is achieved in the transfer pipe with partial-vacuum generators, such as with vacuum pumps or with an ejector apparatus. A transfer pipe typically comprises at least one valve means, by opening and closing which the replacement air coming into the transfer pipe is regulated. Input points at the input end of the material are used in the systems, from which input points the material, such as wastes, is transferred into the system. The system can also comprise refuse chutes into which material, such as waste material, is input and from which the material to be transferred is transferred into a transfer pipe by opening a discharge valve means, in which case, by means of the sucking effect achieved by the aid of the partial vacuum acting in the transfer pipe and also by means of the surrounding air pressure acting via the refuse chute, material such as e.g. waste material packed into bags, is transferred from the refuse chute into the transfer pipe. The pneumatic waste transfer systems in question can be utilized particularly well in densely populated urban areas. These types of areas have tall buildings, in which the input of wastes into a pneumatic waste transfer system is performed via a refuse chute arranged in the building.

The refuse chute is a vertical pipe, preferably comprising a number of input points, which are typically arranged in the wall of the refuse chute at a distance from each other. Tall buildings can comprise many tens, even hundreds, of storeys, in which case the refuse chute forms a very high pipe.

Wastes are transferred pneumatically in a closed system to the reception station, in which the wastes are compressed with a press only after transportation. The pipes of a pneumatic transfer system are in normal cases rather large in diameter, e.g. in the region of 500 mm in their diameter.

Also known in the art are solutions wherein a waste mill, such as a waste grinder, with which the wastes to be input are ground into small size, is arranged in connection with or in the proximity of a waste input location. A waste mill grinds wastes but does not compress the wastes. In the solution in question the blades of waste mills are also subjected to large stressing, in which case they must be replaced often.

Publication WO8203200 A1 discloses a device for fine-grinding, compressing and outputting a high-volume bulk good, more particularly household wastes, by means of which the waste material conducted through the device can be compacted. In the solution according to the publication large output powers are typically needed, especially in situations in which the device is used to cut or fine-grind a material, in which case the energy consumption of the drive devices and the costs of the drive devices are high. In addition, the passage of stones and metals or other corresponding material between the cutting blades can produce breakage of the blades.

The aim of the present invention is to achieve a new type of solution in connection with input points of wastes, or in connection with refuse chutes or waste bins, by means of which the drawbacks of prior art will be avoided.

BRIEF DESCRIPTION OF THE INVENTION

The solution according to the invention has a number of important advantages. By means of the invention a particularly efficient solution for the handling of material, more particularly for pneumatic pipe transport, is achieved. With the solution according to the invention the material to be handled is made to be centered, i.e. is brought towards the center, in which case the material can be efficiently fitted into a transport pipe or a container. More particularly, waste material can with the solution according to the invention be efficiently compacted with the rotary shaper according to the invention and efficient transportation can be achieved with a significantly smaller pipe size compared to unshaped waste material. By using suction, in addition to gravity, to transfer the material to be handled from the rotary shaper into the transport pipe, an advantageous solution for a combination of a rotary shaper and pipe transport is achieved. By forming the output aperture of the rotary shaper to be to some extent smaller than the cross-sectional area of the transport pipe, effective transfer of the handled material into the transport pipe by means of suction can be achieved. By forming the output aperture into a shape that deviates from a circle, e.g. into an oval or elliptical shape, such that the smallest diameter of the output aperture is smaller than the diameter of the transfer pipe and the largest diameter corresponds to the diameter of the transfer pipe, efficient transfer of replacement air can be achieved past the material to be handled and into the transfer pipe. By forming the shape of the aperture of the handling means, an extremely efficient shaping of the material to be handled for onward transportation can be achieved. With a certain magnitude of the angle between the edges of the apertures of consecutive handling means, effective operation of the apparatus is achieved. Further, it can be advantageous to bring about an air current by directing at least a part of the replacement air via the medium ducts and/or from between the handling means such that in suction the seals admit inward air. In this case the air assists the transfer of the material to be handled in the rotary shaper towards the output aperture and onwards into the output aperture. Replacement air can be brought into the rotary shaper e.g. in a corresponding manner to what has been done in connection with refuse chutes, e.g. by applying the solution of publication WO/2009/13037 in connection with the rotary shaper.

The handling devices of a rotary shaper are preferably driven with a drive device and with an applicable power transmission means. According to one preferred embodiment a belt transmission is used to transmit force. There can be one or more drive devices. When using hydraulic motors, the available torque can be increased by using two motors. The motors can be controlled on the basis of the loading i.e. output power, such as on the basis of the current of the electric motors or the pressure of the hydraulics. When the pressure in the hydraulic circuit increases to a certain set value, owing to the material to be handled, the direction of rotation of the drive device and of the rotatable handling means is switched to a second direction. By arranging a blade on a rotatable handling means, preferably a replaceable blade, which acts on the material in the second direction of rotation, the handling of the material can be made more efficient and the possibility of blockages arising can be decreased. In this case the blockage caused in the rotary shaper by the material to be handled is relieved by rotating the rotatable handling means in a second direction and the handling means simultaneously, preferably with a blade, breaks the material to be handled, in which case a blockage possibly caused by the material can be removed. When the blade is arranged to act only in the second handling direction, the cutting action performed by the blade is brought into use from time to time or when necessary by changing the direction of rotation of the handling means. By driving the rotatable handling means in different directions of rotation in cycles, i.e. in sequences, effective operation of the device can be ensured and the possibility of blockages arising can be decreased. By using the own motors of the rotatable handling means as the drive devices, different properties, such as different speeds of rotation, torques, et cetera, can be achieved for the different handling means. According to one embodiment of the invention the drive devices are hydraulic motors, which are connected in series such that they rotate their own handling means in the same direction. Hydraulic drive devices connected in series give the advantage that the driving force can automatically be directed to the drive device that has a greater loading. According to a second embodiment the drive devices can be connected so that each rotatable handling means can, if necessary, be rotated with its own motor(s), in which case the direction of rotation can be changed individually, in which case the handling means can be rotated, if necessary, in opposite directions with respect to each other. Additionally, if necessary, the whole output power can be connected to drive only just one rotatable handling means. On the other hand, the material to be handled can be further compressed with a second compression phase arranged between the output aperture of the rotary shaper and the transport pipe, in which compression phase the press device is a piston-cylinder combination. With the second press device also the transfer of handled material into a transfer pipe is achieved.

BRIEF DESCRIPTION OF THE FIGURES

In the following, the invention will be described in more detail by the aid of an example of its embodiment with reference to the attached drawings, wherein.

DETAILED DESCRIPTION OF THE INVENTION

Figure 1:
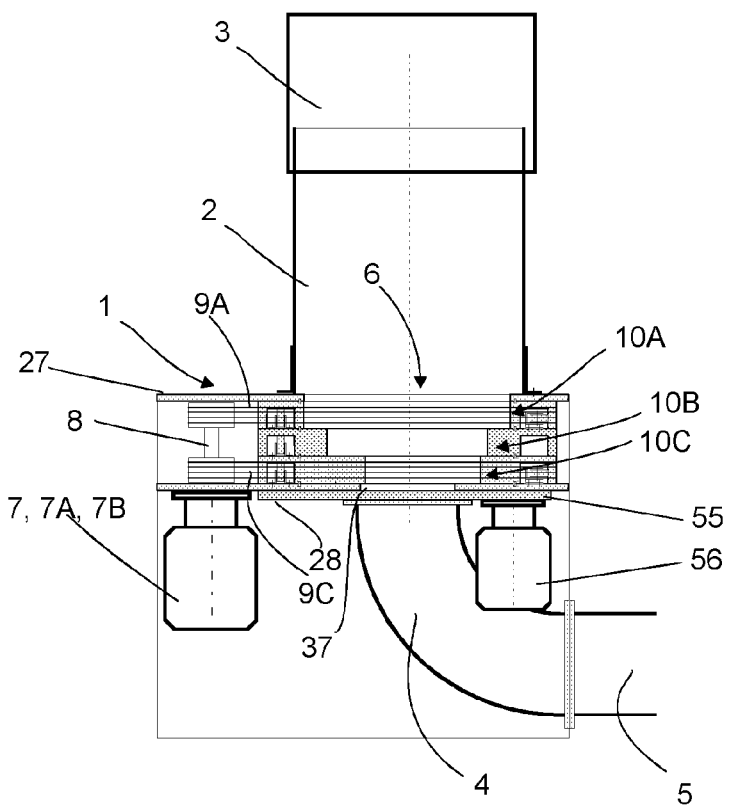
FIG. 1 presents a simplified embodiment of an apparatus according to the invention.

FIG. 1 presents one embodiment of the solution according to the invention, in which the rotary shaper device 1 is arranged in connection with a refuse chute 3 or corresponding with a fitting part 2. Only a part of the refuse chute is presented. The material, such as household waste, waste paper, cardboard or other waste, is input into a refuse chute 3 and from there onwards, via a fitting part 2, into an input aperture 6 of the rotary shaper 1. The material to be handled is shaped and compacted in the rotary shaper and after handling is conducted via an output coupling 4 into transfer piping 5 by means of suction and/or a pressure difference produced by e.g. the drive devices of a pneumatic pipe transport system. One advantage of the embodiment of the invention is that the waste material is made into a suitable shape, in which it fits for transferring in transport piping 4, 5. In this case transfer piping 5 that is significantly smaller in diameter can be used. According to one embodiment e.g. a pipe with a diameter in the region of 150-300 mm, preferably in the region of 200 mm, can be used as a transfer pipe 5. According to the invention simultaneous suction is used in the embodiment, in which case the material to be handled can be influenced with suction or a pressure difference acting via the transfer pipe 5 and the output coupling 4 when conducting the material through the handling means 10A, 10B, 10C of the rotary shaper 1. The handling means are rim-like, each of which has an aperture 11A, 11B, 11C (FIGS. 4a, 4b, 4c) from the first side, from the input side, to the output side. At least a part of the handling means are rotated in the embodiment of the figure around the vertical axis with the drive device 7 and with the transmission means 8, 9A, 9C. In the figure the topmost rotatable handling means 10A and the bottommost rotatable handling means 10C are rotated, and between them remains a non-rotating, stationary handling means 10B. A valve means 55, such as a disc valve, which is driven with a drive device 56 of the valve, can be below the rotary shaper 1. The valve means 55 opens and closes the connection between the rotary shaper and the output coupling 4 and thus with the valve means 55 the suction effect from the transfer pipe into the rotary shaper is adjusted.

Figure 2:
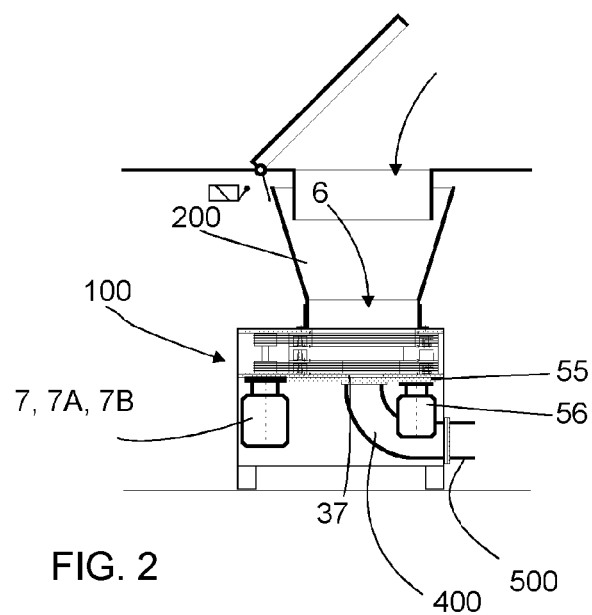
FIG. 2 presents a simplified embodiment of an apparatus according to the invention.

Correspondingly, according to the second embodiment of the invention, the rotary shaper is used in the embodiment of FIG. 2 in connection with an input point of the materials transfer system, such as in connection with an input point of kitchen waste. The rotary shaper 100 is fitted in connection with the feeder hopper 200 of an input point, in which case the material to be handled is input from the feeder hopper 200 into the input aperture 6 of the rotary shaper. In the rotary shaper the material is shaped into a suitable shape for transportation in piping and is conducted from the output coupling 400 to further handling, e.g. via the transfer piping 500 of a pneumatic pipe transport system.

The rotary shaper comprises a frame, onto which ring-shaped handling means 10A, 10B, 10C are arranged. In the vertical direction a plurality of ring-like handling means 10A, 10B, 10C, which comprise an aperture 11A, 11B, 11C leading from the first side to the second side of the ring, is arranged below the input aperture 6 of the material to be handled. The ring-like handling means are adapted in connection with a relative rotational movement around a geometric axis, which is mainly identical with the geometric axis of an input chute, to transfer an inputted bulk good into the center of the rings through the ring-like handling means by gravity and/or by means of the suction/pressure-difference produced by the partial-vacuum generators of a pneumatic materials handling system, such as of a pipe transport system, at least by shaping the bulk good simultaneously with the combined action of the rotating rings and at least one stationary (non-rotating) ring. The handling means 10A, 10B, 10C can be adapted to rotate in opposite directions to each other, but as is presented in the figures in the preferred embodiment, every second ring-like handling means 10B (in the figure, the centermost handling means 10B) is fixed immovably to the frame and every second ring-like handling means 10A, 10C (in the figure, the topmost and the bottommost handling means) is fixed rotatably. The speed of rotation and the direction of rotation of the rotatable handling means can according to one embodiment be varied.

According to one embodiment the rotatable handling means have different speeds of rotation. According to one embodiment the first handling means 10A in the direction of travel of the material is rotated faster and the rotatable handling means following it in the direction of travel of the material are rotated typically more slowly. In the figure the bottommost rotatable handling means 10C thus rotates more slowly than the first rotatable handling means 10A. Between them in the vertical direction is a non-rotating handling means 10B. The interpositioning between the inner walls of the apertures 11A, 11C of the rotatable handling means 10A, 100 changes, at least on the plane of rotation, during rotation, which function is advantageous with regard to the effective handling of material.

Figure 5:
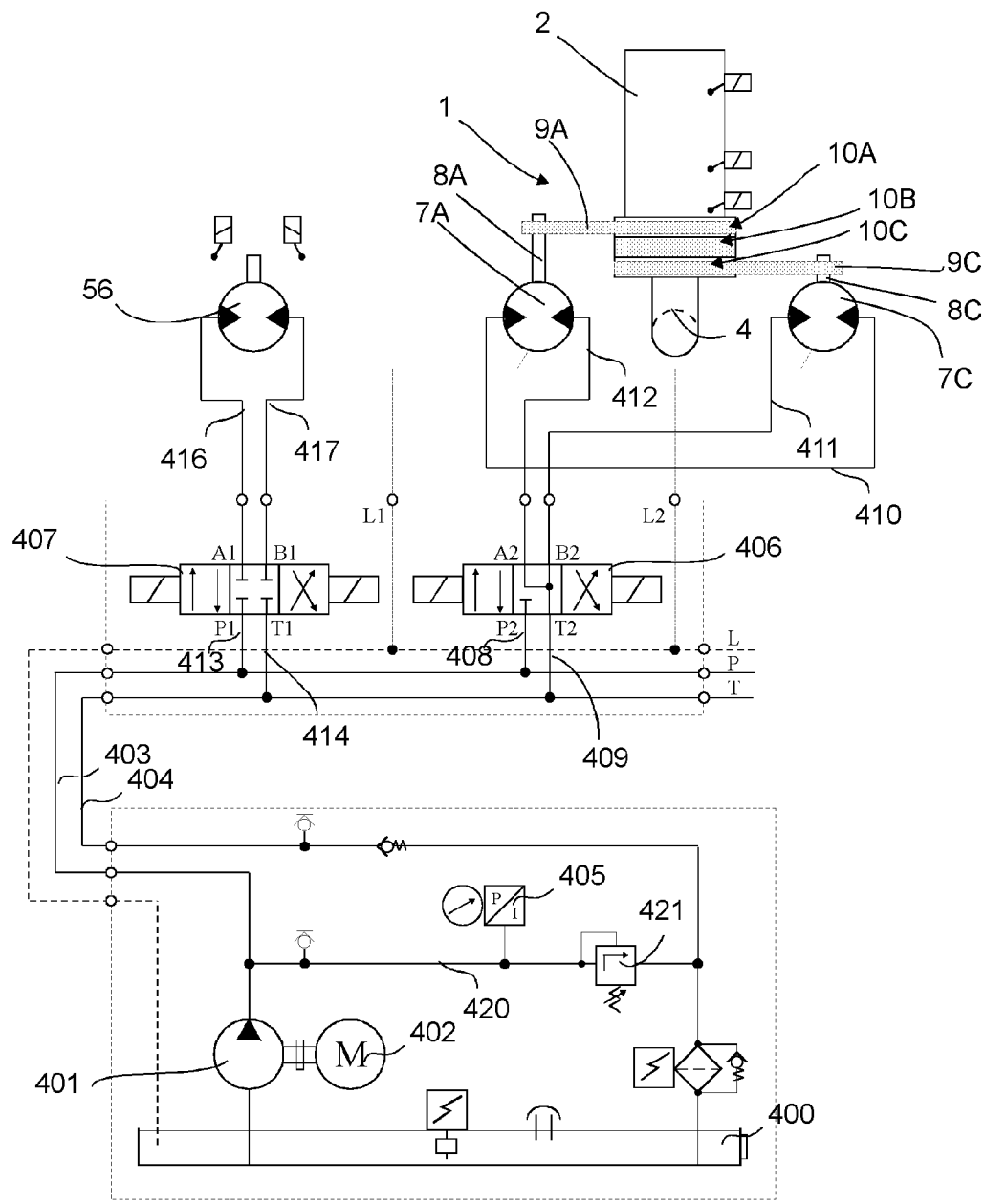
FIG. 5 presents a part of an embodiment of an apparatus according to the invention and the hydraulic diagram of it.

The rotatable handling means 10A, 10C are rotated in the embodiment of FIG. 5 by a drive device 7A, 7C, e.g. by means of a transmission means, such as a belt transmission 8A, 8B, 9A, 9C. The outer rim 15A, 15C of a ring-like handling means 10A, 10C is adapted to function as a countersurface of the transmission means of the power transmission of the drive device, e.g. for a belt means 9A, 9C, which countersurface is included in the power transmission apparatus for bringing about rotation of a ring. The outer rim 15A, 15C of the handling means 10A, 10C can be shaped suitably. For example, a cambered or barrel-like shape has been observed to be very effective in one embodiment. The rotation trajectory of a handling means is achieved by arranging e g limiting means and/or bearing means and a countersurface to the ring-like handling means, most suitably a rim-like rolling surface or sliding surface, onto the rim of which the limiting means and/or bearing means are arranged in a distributed manner.

According to the embodiment of FIG. 5, each rotatable handling means 10A, 100 is driven with its own drive devices 7A, 7C. The drive shaft 8A, 8C of each drive device 7A, 7C is arranged to rotate a handling means via a transmission means 9A, 9C.

In the embodiment of the figure, the drive devices 7A, 7C are pressure medium driven hydraulic motors. The drive devices 7A, 7C are connected in series in the hydraulic circuit.

FIG. 5 presents the hydraulic diagram of one embodiment, wherein the drive devices 7A and 7C are connected in series. In the diagram, pressure medium is conducted from the pressure medium reservoir 400 of the drive system with a pump device 401, which is adapted to be driven by a drive device 402, to the output line 403 of the circuit. In the diagram, the return line 404 of the hydraulic circuit brings the pressure medium that has circulated in the circuit back into the pressure medium reservoir 400. From the output line 403 the supply of pressure medium to the drive devices 7A, 7C of the handling means is controlled with a directional control valve 406. With the valve the direction of rotation of the drive devices can also be controlled by conducting pressure medium from the output line from the duct 408 to either duct 411 or duct 412. The drive devices 7A, 7C are connected in series with a medium duct 410. The drive device 7A rotates the drive shaft 8A, around which the transmission means 9A is arranged, in which case the transmission means 9A moves the handling means 10A. Correspondingly, the drive device 7C rotates the drive shaft 8C, around which the transmission means 9C is arranged, in which case the transmission means 9C moves the handling means 10C. By changing the position of the directional control valve 406, movement in a first direction (first position of the directional control valve 406 of the diagram, on the left in the figure) can be achieved, in which case the pressure medium is conducted from the output line 403 via the duct 408 via the pathway of the valve to the duct 412 to the first drive device 7A, from where the medium circulates via the medium duct 410 to the second drive device 7C and from there via the duct 411 via the pathway of the directional control valve to the duct 409 and onwards to the return line 404. In the right-hand position, with respect to the figure, of the directional control valve 406, movement in the opposite direction is achieved. In this case the pressure medium is conducted from the output line 403 via the duct 408 via the pathway of the valve 406 to the duct 411 to the second drive device 7C, from where the medium circulates via the medium duct 410 to the first drive device 7A and from there via the duct 412 via the pathway of the directional control valve to the duct 409 and onwards to the return line 404.

In the circuit of FIG. 5 the drive devices 7A, 7C are arranged to rotate the handling means 10A, 100 in the same direction. By interchanging one or the other of either the connections of duct 410 and 412 on the side of the drive device 7A or the connections of duct 410 and 411 on the side of the second drive device 7C, an arrangement can be achieved wherein the drive devices are arranged to rotate the handling means in opposite directions. According to the invention, the rotatable handling means 10A, 10C are rotated preferably in the same direction, i.e. according to the circuit of the diagram.

A pathway 420 of the medium on the pressure side of the pump 401 is arranged in the circuit, which pathway of the medium comprises a pressure sensor 405, and also the pathway 420 of the medium comprises a pressure relief valve 421, which allows medium from the pressure side of the pump into the return line 405 and onwards into the medium reservoir 400, if the set value of the pressure relief valve 420 is reached.

The drive devices 7A, 7C are, according to one embodiment, arranged to be of different sizes in terms of their performance capability. The drive device 7C of the second handling means 10C (i.e. the bottommost handling means in the embodiment of the figure) is in practice often forced to handle the largest load, in which case it is arranged to rotate at a slower speed of rotation than the drive device 7A of the first handling means. The torque of the second drive device 7C is, however, larger than the torque produced by the first drive device 7A.

The rotary shaper is, according to one embodiment, preferably driven in a sequence, which has a certain duration $t_1$, for the extent of which the handling means 10A, 10C are rotated in a first direction, after which the direction of rotation is changed. After this the handling means 10A, 10C are rotated in the opposite direction for a second period time $t_2$. The first direction is the actual handling direction of the shaper. The second direction is that in which the possible blade part 14A, 14C of the handling means is adapted to cut the material. The rotation duration $t_2$ of the second direction of rotation is typically shorter than the duration $t_1$ of the first direction of rotation. According to one embodiment preferably an equation is followed, according to which $t_2=0.5*t_1$.

Typically the rotation duration $t_1$ of the first direction of rotation is in the order of 10 seconds and the duration $t_2$ of the opposite direction of rotation is 5 seconds.

If a rotatable handling means 10A, 10C stops during handling, e.g. for a reason caused by the material to be handled, such as owing to a blockage, the direction of rotation of the handling means is changed.

By means of the information given by the pressure sensor 405, an increase of pressure in the circuit can be detected, which is a consequence of the stopping of the handling means 10A or 100. As a consequence of this the direction of rotation of the handling means is changed, e.g. with the purpose of eliminating a blockage.

A handling means 10A, 10C is provided with a blade 14A, 14C, which can be detached and replaced with a new one. The material to be handled is acted on with the blade 14A, 14C when the handling means 10A, 10C is rotated in a second direction. The blade 14A, 14C is preferably adapted to cut the material to be handled.

When the handling means 10A, 10C are rotated in the opposite direction with respect to the handling direction, the replacement air valve is kept in the open position, in which case material is transferred in the transfer piping at least from the area of influence of the rotary shaper or from the proximity of it.

The diagram of FIG. 5 also presents the drive system of the drive device 56 of the valve means 55. The drive device 56 is in the embodiment of the diagram pressure medium driven drive device, such as a hydraulic motor. In the diagram, pressure medium is conducted from the pressure medium reservoir 400 of the drive system with a pump device 401, which is adapted to be driven by a drive device 402, to the output line 403 of the circuit. In the diagram, the return line 404 of the hydraulic circuit brings the pressure medium that has circulated in the circuit back into the pressure medium reservoir 400. From the output line 403 the supply of pressure medium to the drive device 56 of the valve is controlled with a directional control valve 407. With the directional control valve 407 also the direction of rotation of the drive device 56 can be controlled by conducting pressure medium from the output line from the duct 413 to either duct 416 or duct 417. By changing the position of the directional control valve 407, movement of the shut-off means of the valve 55 produced by the drive device in a first direction (first position of the directional control valve 407 of the diagram, on the left in the figure) can be achieved, in which case the pressure medium is conducted from the output line 403 via the duct 413 via the pathway of the valve to the duct 416 to the drive device 56, from where the medium circulates via the medium duct 417 via the pathway of the directional control valve to the duct 414 and onwards to the return line 404. In the right-hand position, with respect to the figure, of the directional control valve 407, movement of the shut-off means of the valve 55 produced by the drive device 56 is achieved in the opposite direction. In this case the pressure medium is conducted from the output line 403 via the duct 413 via the pathway of the valve 407 to the duct 417 to the drive device 56, from where the medium circulates via the medium duct 416 via the pathway of the directional control valve to the duct 414 and onwards to the return line 404. The extent of the movement of the shot-off means of the valve 55 can be regulated e.g. with limit switches.

Additionally, according to one embodiment the rotary torque can be varied. The handling means 10A, 10C can be rotated individually according to one embodiment, in which case each handling means has its own drive device.

The handling means 10A, 100 can alternatively be driven with electric motors.

The ring-like handling means 10A, 10B, 10C, or at least a part of them, and the inner surface 13A, 13B, 13C of their apertures 11A, 11B, 11C are patterned and/or arranged to be such in their shape that their rotational movement simultaneously feeds material onwards from an aperture 11A, 11B, 11C towards the output end and the output aperture 37. Typically at least the rotating handling means 10A, 10C are arranged to be such that they transfer material towards the output end and the output coupling 4.

Figure 3A:
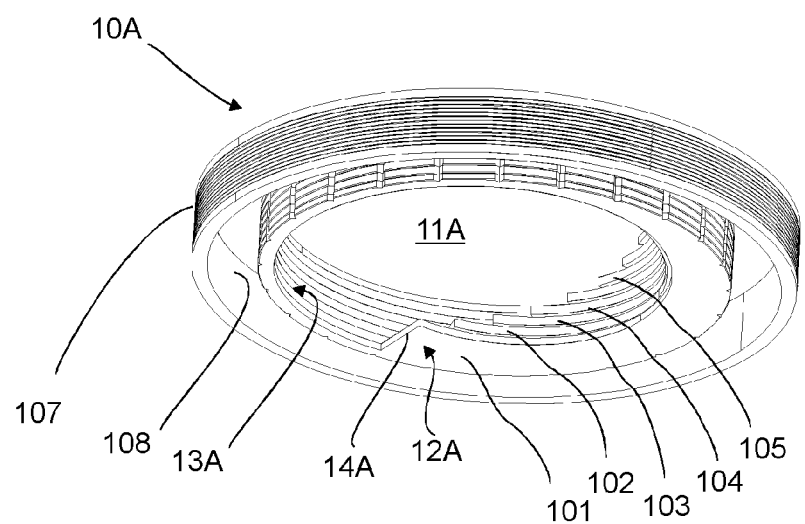
FIG. 3a presents an embodiment of a handling means of an apparatus according to the invention.

FIG. 3a presents a first rotatable ring-like handling means 10A according to one embodiment of the invention, which means can be fitted into the rotary shaper mainly below the input aperture 6. The ring-like handling means 10A is mainly of a circular cylindrical shell 107, which has an outer rim 15A. The shell 107 can also be cambered. The ring-like handling means, or at least the frame of it, can be formed from one piece or e.g. from a number of plate parts 101, 102, 103, 104, 105 fixed one above the other, which are fixed to each other. The plate parts fitted one on top of another to form a ring-like handling means can be fitted among themselves with respect to each other such that the sections formed by their inward-pushing part 12A are displaced with respect to each other, in which case they are at an angle of e.g. 5-30 degrees, preferably 10-20 degrees, with respect to each other. In addition, a cutting blade 14A can be achieved when changing the rotation direction. The blade 14A can also be a separate, replaceable part.

The ring-like handling means, or at least a part of them, can typically be formed from a number of plate parts 101, 102, 103, 104, 105 fixed one above the other, which are fixed to each other. The parts 101, 102, 103, 104, 105 can be formed such that an aligning aperture is arranged in them in the machining phase, in which aligning aperture the desired displacement of the plate parts with respect to each other has been taken into account, and from where the plates can be fixed to each other, e.g. by welding.

In the embodiment of FIG. 3a, a counterpart 108, such as a groove, is arranged in the ring-like means for the aligning means, for the bearings, or for corresponding.

Figure 3B:
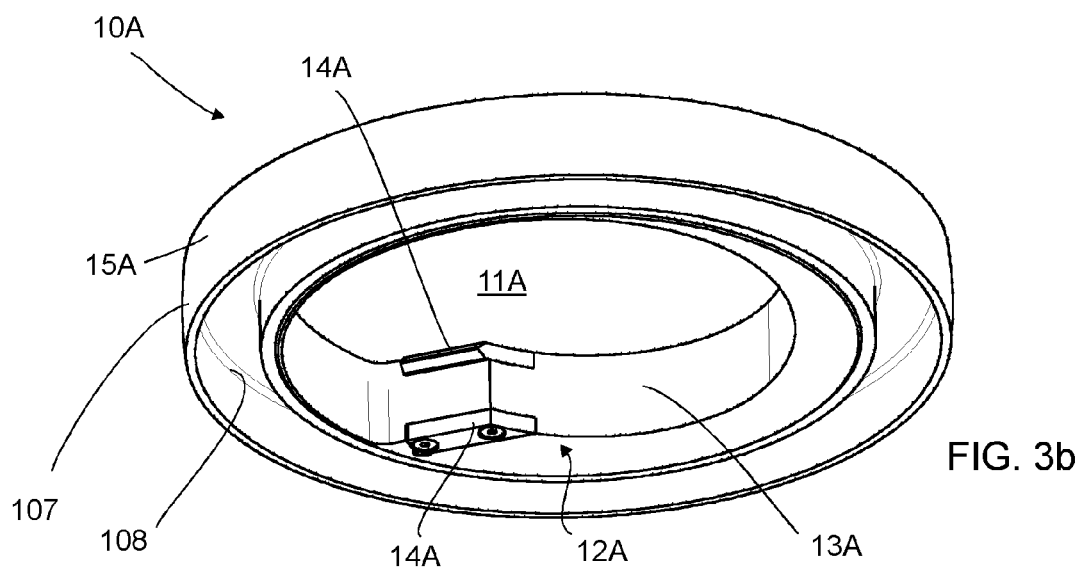
FIG. 3b presents a second embodiment of a handling means of an apparatus according to the invention.
Figure 3C:
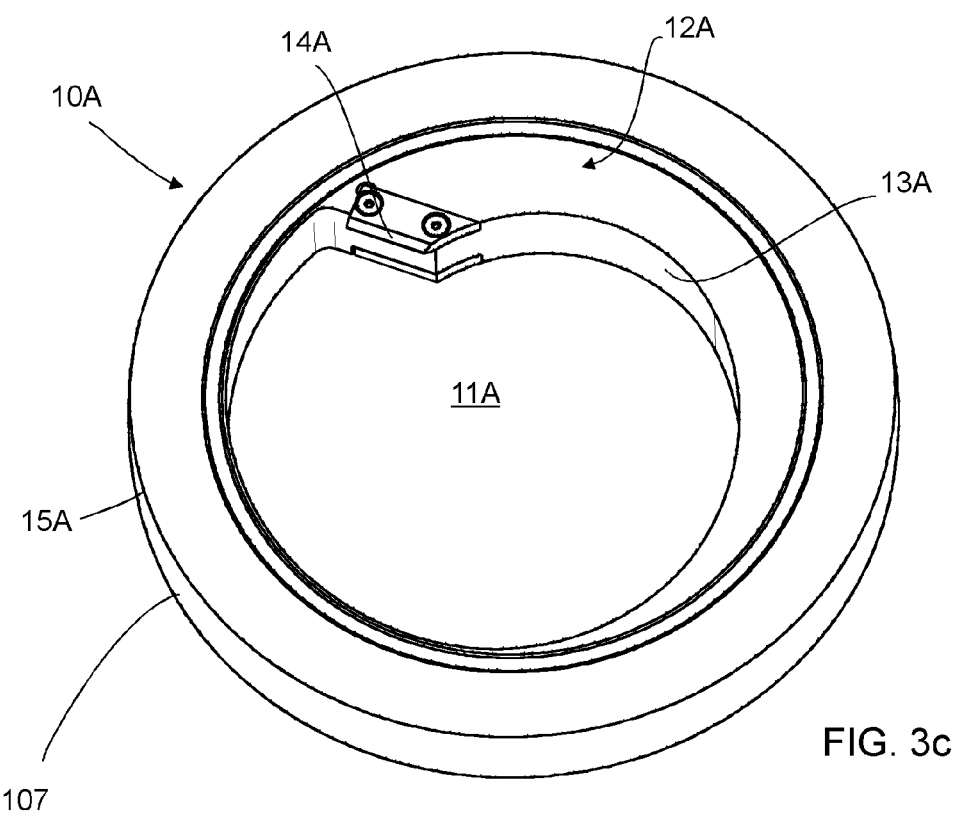
FIG. 3C presents an embodiment of the handling means according to FIG. 3b from another direction.

FIGS. 3b and 3c present a second embodiment of a ring-like handling means 10A. In the embodiment a handling means has at least one cutting blade 14A arranged on the inward-pushing part 12A, which blade is fixed with fixing means, such as screws, to the inward-pushing part 12A. In the embodiment according to FIGS. 3b and 3c, two cutting blades 14A are arranged on the handling means, which blades are at a distance from each other in the height direction of the handling means 10A, i.e. in the main input direction of the material.

Figures 4A, 4B, 4C:
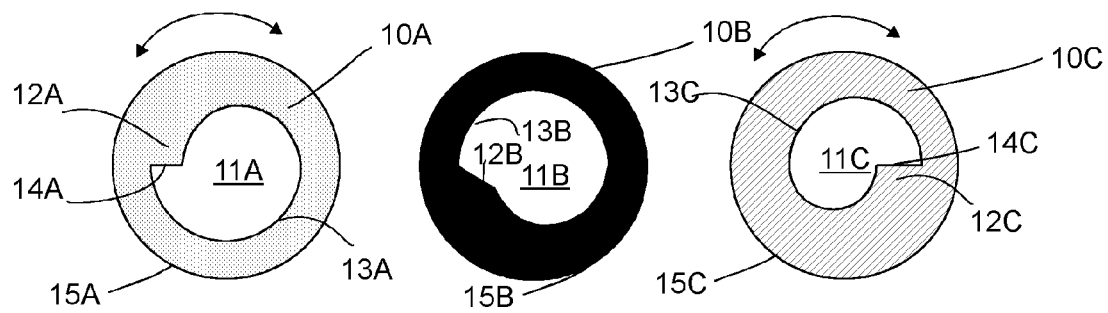
FIG. 4a presents a simplified first rotatable handling means of an apparatus according to the invention.
FIG. 4b presents a simplified first stationary (non-rotatable) handling means of an apparatus according to the invention.
FIG. 4c presents a simplified second rotatable handling means of an apparatus according to the invention.

As can be seen particularly from the diagrammatic FIG. 4a, the first handling means 10A is provided with a wing-shaped part 12A pushing inwards towards the center of the ring, which part takes a part of the surface surrounded by the ring and which is shaped with a wing surface 13A that faces towards the center axis of the handling means 10A, the curved shape of which surface can preferably be a so-called Archimedes spiral, i.e. it has an inwardly decreasing radius. The part 12A that pushes towards the center of the handling means thus limits the eccentric aperture 11A going through the ring. When the handling means 10A is rotating, the wing surface 13A determines the through-passage aperture 11A through the handling means that is free of obstacles. Means, such as a threaded groove or a band, which when the handling means rotates in the input direction at the same time feeds the material to be handled from the aperture 11A onwards in the handling direction, can thus be formed on the inner surface 13A, i.e. on the wing surface, of a handling means. In addition, a cutting blade 14A can be achieved when changing the direction of rotation. The blade 14A can also, according to one embodiment, be a separate, replaceable part.

In the rotary shaper according to the invention a non-rotating handling means 10B is adapted below and supports the topmost rotating handling means 10A, which non-rotating handling means is fixed to the housing 27, 28 with fixing elements. The non-moving handling means 10B is typically formed in a corresponding manner to the rotating ring 10A described earlier. The dimensions of the wing-shaped part 12B thus become smaller inwards when viewed in a direction radially to the center of the ring, which is in one embodiment opposite with respect to the direction of rotation of the rotating handling means.

The second handling means, i.e. the stationary handling means 10B, thus comprises, as is seen especially from the diagrammatic FIG. 4b, a wing-shaped part 12B that pushes in towards the center of the ring, and comprises a wing surface 13A. The wing-shaped part 12B pushes farther in towards the center of the handling means than the corresponding part 12A of the handling means 10A. In addition, the second handling means can be provided with a cutting blade 14B. The blade 14B can also be a separate, replaceable part.

In a corresponding manner the second rotatable handling means 10C also comprises a wing-shaped part 12C, as is seen especially from the diagrammatic FIG. 4c, which wing-shaped part comprises a wing surface 13C. The wing-shaped part 12C pushes to some extent even farther in towards the center of the handling means 10C such that the handling means 10C when it rotates determines the through-put aperture that is free of obstacles, which aperture is smaller than the corresponding free through-put aperture in connection with the handling means 10A and 10B. In addition, a cutting blade 14C can be achieved when changing the direction of rotation. The blade 14C can also be a separate, replaceable part.

Figures 4D, 4E:
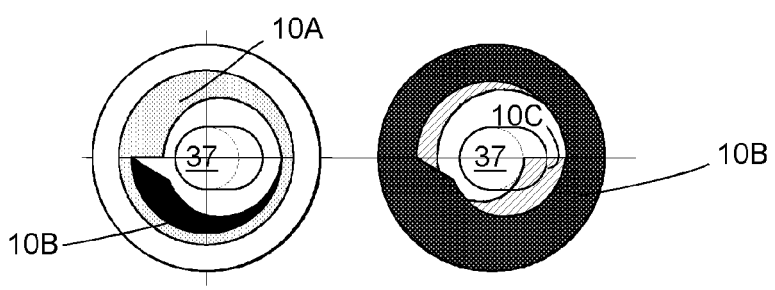
FIG. 4d presents a simplified view of one operating state of a first rotatable handling means and of a stationary handling means of an apparatus according to the invention, as viewed in the input direction.
FIG. 4e presents a simplified view of one operating state of the stationary handling means and of the second rotatable handling means of an apparatus according to the invention, as viewed in the input direction, and with the first rotatable handling means removed.

FIG. 4d presents the free passage aperture after the first and the second handling means 10A, 10B, and also the output aperture 37, which is smaller than the one before it, after the compression means of the press. FIG. 4e presents the output aperture 37 after the second and the third handling means 10B, 10C, which aperture is thus essentially a free through-put aperture through the press.

The bottommost rotating handling means 10C is arranged rotatably on the base, which comprises an output aperture 37 for feeding out via it the bulk good compressed by means of the rings.

The material conducted through the handling means 10A, 10B, 10C in the rotary shaper is compressed and compacted. The output aperture 37 of the rotary shaper is, according to one embodiment, arranged to be to some extent smaller than the diameter of the next pipe, such as of the transfer pipe 4, 5, at least in one direction. By forming the output aperture of the rotary shaper to be to some extent smaller than the diameter of the transport pipe, effective transfer of the handled material into the transport pipe by means of suction can be achieved. According to one embodiment the output aperture 37 is formed in its diameter to a second lateral direction to be to some extent smaller than it is in the lateral direction at a right angle to it, in which case the output aperture is e.g. oval in shape. Other shapes are also possible. According to a second embodiment the output aperture is formed in at least one lateral direction to be larger than the free pathway through the handling means, in which case replacement air can be conducted out of the output aperture via the output aperture.

Typically the limiting means and/or bearing means are arranged between the bottommost ring-like handling means 10C and the base part 28 of the frame part, between the bottommost handling means 10C and the centermost, most suitably non-rotating, handling means 10B, and between the non-rotating handling means 10B and the topmost handling means 10A. It can also be conceived that separate rolling means are not used, but instead the handling means are arranged to rest on one another and/or to rest on the base part 28 of the frame part. In this case the bringing of the medium to between the handling means and the support surfaces that is described below can be utilized.

The diameter of the output aperture 37 is thus in one embodiment to some extent smaller than the diameter of the section of transfer pipe 4, 5 following it. According to one embodiment the smallest diameter of the output aperture is at least 2-20 percent, preferably 4-15 percent, smaller than the section of transfer pipe following it. In this case, when the suction is on, the material to be handled does not stick to the inside wall of the pipe but instead immediately accelerates into motion. According to a second embodiment the smallest diameter of the output aperture is at least 5 percent smaller than the section of transfer pipe following it. In one embodiment the smallest diameter of the output aperture 37 is 180 mm, in which case the diameter of the transfer pipe is 210 mm. When the output aperture is of a shape that deviates from a circle, such as of an oval or elliptical shape, the largest diameter of the output aperture can then correspond to the diameter of the transfer pipe (e.g. 210 mm), and the smallest diameter is to some extent smaller (e.g. 180 mm) than the diameter of the transfer pipe.

The rotational movement of the handling means 10A, 10C can also be achieved e.g. with an electric motor or with other arrangements. According to a second embodiment the rotational movement is achieved with a hydraulic motor such that both the rotatable handling means 10A, 100 are rotated with two shared hydraulic motors 7. In this case in the normal operating process both the handling means 10A, 100 can be rotated with one motor.

The rotary shaper thus functions in a way as a re-arranger and compactor (i.e. as a formatter). Under the effect of suction the handling means 10A, 100 of the rotary shaper shape the material to be handled so that it fits into an output aperture 37.

The direction of rotation of the handling means 10A, 10C can be varied. Should too large a load arise, the handling means stops and the direction of rotation is changed. When the load increases to be too large for one of the rotatable handling means, its direction of rotation is changed. The rotation is preferably detected with a motion sensor, e.g. from the diverting pulleys of the drive apparatus and/or from a pressure sensor 405 of the hydraulics.

The apertures of the handling means can be of different sizes and in a different position with respect to the center, so that the loading can be efficiently distributed and that a sufficiently large aperture for waste is obtained.

The handling means 10A, 10C can according to one embodiment be rotated in opposite directions with respect to each other, in which case the material to be handled does not start to rotate along with the handling means. Rotation of the material would disrupt shaping of the material into the desired shape.

It is also advantageous to rotate the handling means at a different speed, because then the compression on each cycle changes at different points and a suitable compression for each waste is always obtained at some point.

With specific types of material, such as with cardboard and paperboard, a compressor means (not presented in the figures) can also be used, which compressor means compresses the wastes against the handling means from above.

This waste type probably also requires the aforementioned inner surface 13A, 13B, 13C of the shaped apertures 11A, 11B, 11C, which inner surface partly rips apart the cardboard and feeds it onwards.

Cardboard or other corresponding material types are typically challenging for pneumatic transportation, because a bent sheet easily opens and spreads against the inner surface of the piping and allows the air to pass it. With the apparatus according to the invention it is compacted and shaped into a suitable "cartridge", which is suited to the transport piping.

When the handling means 10A is rotating, the inner surface 13A determines the through-passage aperture 11A through the handling means that is free of obstacles. Means, such as a threaded groove or a band, which when the handling means rotates in the input direction at the same time feeds the material to be handled from the aperture 11A onwards in the handling direction, can thus be formed on the inner surface 13A of a handling means.

In the rotary shaper according to the invention a non-rotating handling means 10B is adapted below and supports the topmost rotating handling means 10A, which non-rotating handling means is fixed to the housing with fixing elements. The non-moving handling means 10B is typically formed in a corresponding manner to the rotating ring 10A described earlier.

In a corresponding manner the second rotatable handling means 10C also comprises an aperture 11C, which comprises an inner surface 13C, as is seen especially from the diagrammatic FIG. 4c.

According to one embodiment the aperture 11A, 11B, 11C of each consecutive handling means is smaller in the transport direction of the material than the aperture of the preceding handling means, in which case the pathway towards the output aperture 37 narrows.

The bottommost rotating handling means 10C is arranged rotatably on the base 28, which comprises an output aperture 37 for feeding out via it the bulk good compressed by means of the rings.

The general operation of a prior-art rotary press is presented e.g. in publication WO8203200 A1, and it is not described in more detail in this publication.

The degree of shaping can be influenced with the size and shape of the apertures of the shaping means, and also with the patterning on the inner edge of the aperture. Household waste input as a shaped stream into the transfer pipe is transferred in the pipe onwards by means of suction and/or a pressure difference to the reception location, such as to a waste station or corresponding.

The invention thus relates to a method for handling material in a pneumatic materials handling system, in which material, such as waste material is input from an input aperture of an input point, such as from the input aperture of a refuse chute 3 or of some other input point 200, and is handled with a shaping device 1, arranged in connection with the input point or in the proximity of it, to be more compact and is transferred onwards, which shaping device 1 is a rotary shaper, which comprises rotatable handling means 10A, 10C, which comprise an aperture 11A, 11C, which is arranged eccentrically with respect to the axis of rotation, and which rotary shaper comprises at least one stationary handling means 10B, in which case the material to be handled is conducted into the rotary shaper and/or through it at least partly by means of gravity. The material to be handled is conducted into the rotary shaper and/or through it at least partly by means of suction and/or a pressure difference.

According to one embodiment each rotatable handling means 10A, 10C is driven with it own drive device 7A, 7C.

According to one embodiment at least a part of the handling means 10A, 10C of the rotary shaper when rotating feeds the material to be handled through the handling means, at least when rotating in a first direction.

According to one embodiment the rotatable handling means 10A, 100 shapes the material, together with at least one other preferably stationary handling means 10B.

According to one embodiment in the direction of travel of the material to be handled the cross-sectional area of the material flow passing through the handling means 10A, 10B, 100 of the rotary shaper is decreased such that the material can be conducted into the material transfer pipe 4, 5 disposed after the rotary shaper.

According to one embodiment the direction of rotation of the rotatable handling means 10A, 10C can be varied.

According to one embodiment the rotatable handling means 10A, 10C are rotated at different speeds with respect to each other.

According to one embodiment the rotatable handling means 10C farther on in the direction of travel of the material to be handled is rotated more slowly than at least one handling means 10A preceding it in the direction of travel of the material.

According to one embodiment the drive device 7A, 7C of a rotatable handling means is an electric motor, a pneumatic motor or a hydraulic motor.

According to one embodiment the pneumatic materials handling system is a pipe transport system of material, more particularly of waste material.

According to one embodiment the direction of rotation of a handling means 10A, 10C is changed on the basis of time and/or the loading, i.e. output power, of the drive device 7A, 7C of the handling means.

According to one embodiment the rotatable handling means 10A, 10C are driven in sequences, in which case the handling means 10A, 10C are rotated in a first direction for a first period of time $t_1$ and after that in the opposite direction for a second period of time $t_2$.

According to one embodiment the first time $t_1$ is greater than the second time $t_2$, preferably the second time $t_2 \leq 0.5 \times$ the first time $t_1$.

According to one embodiment the material is removed from the transfer pipe 4, 5 that is in the proximity of the rotary shaper and the replacement air valve is preferably kept open at least when the rotatable handling means 10A, 10C are rotated in a second direction.

According to one embodiment at least one blade part 14A, 14C, more particularly a replaceable blade part, is arranged in a rotatable handling means 10A, 10C, which blade part is adapted to act on the material when the handling means is rotated in a second direction.

According to one embodiment the drive devices 7A, 7C are hydraulic motors, which are connected in series.

The invention also relates to an apparatus for handling material in a pneumatic materials handling system, such as in a pipe transport system, which comprises at least one input point, such as a refuse chute 3 or some other input point 200, and a shaper device 1, arranged in connection with the input point or in the proximity of it, and means for transferring material onwards in the transfer piping, which shaper device is a rotary shaper 1, 100, a part of the rim-like handling means 10A 10B 10C of which are rotatable handling means 10A, 10C, and which handling means comprise an aperture 11A, 11B, 11C, which is arranged eccentrically with respect to the axis of rotation of the rotatable handling means, and a part are stationary handling means 10B, and that the material to be handled is fitted to be conducted into the rotary shaper and through it at least partly by means of gravity. The material to be handled is fitted to be conducted into the rotary shaper and through it at least partly by means of suction and/or a pressure difference.

According to one embodiment the apparatus comprises a drive device 7A, 7C for a rotatable handling means (10A, 10C such that each rotatable handling means 10A, 10C is adapted to be driven with its own drive device 7A, 7C.

According to one embodiment at least a part of the handling means 10A, 10B, 10C of the rotary shaper comprise surface patterning or a corresponding means, such as a thread section, that feeds material, which surface patterning is adapted when the handling means 10A, 10C is rotated in at least a first direction to transfer the material to be handled through the compression phase formed by the handling means of a rotary press.

According to one embodiment in the direction of travel of the material the cross-sectional rea of the material pathway 11A, 11B, 11C passing through the handling means 10A, 10B, 10C of the rotary shaper decreases in the direction of travel of the material.

According to one embodiment the drive devices 7A, 7C are adapted to rotate the rotatable handling means 10A, 10C at different speeds with respect to each other.

According to one embodiment the rotatable handling means 10C farther on in the direction of travel of the material to be handled is adapted to be rotated with the drive device 7C more slowly than at least one handling means 10A preceding it in the direction of travel of the material with its drive device 7A.

According to one embodiment the drive devices 7A, 7C of the rotatable handling means 10A, 10C are, in their operating characteristics, such as in their output power or in their torque or in their speed of rotation, different to each other.

According to one preferred embodiment the output aperture 37 of the rotary shaper is at least partly smaller than the flow aperture of the transfer pipe 4,5 following it in the material transfer direction.

According to one embodiment the output aperture 37 of the rotary shaper is at least partly larger than the free pathway through the handling means 10A, 10B, 100, in which case the output aperture is preferably e.g. oval or elliptical in shape.

According to one embodiment the aperture 11A, 11B, 11C of the handling means is disposed eccentrically with respect to the axis of rotation.

According to one embodiment at least one blade part 14A, 14C, more particularly a replaceable blade part, is arranged in a rotatable handling means 10A, 10C, which blade part is adapted to act on the material when the handling means is rotated in a second direction.

According to one embodiment the drive devices 7A, 7C are hydraulic motors, which are connected in series.

Typically the material is waste material, such as waste material arranged in bags. The refuse chute can be fitted to be a part of a pneumatic waste transfer system or it can be a separate part, in which waste material is conducted into the waste room, waste container or corresponding.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. Method for handling material in a pneumatic materials handling system, comprising the following steps:
   inputting material from an input aperture of an input point of a refuse chute (3);
   handling the material with a shaping device (1), arranged in connection with the input point or in the proximity of the input point, to be more compact and transferring the material onwards through a transfer pipe (4, 5), said shaping device (1) being a rotary shaper, which comprises rotatable handling means (10A, 10C) including an aperture (11A, 11C), which is arranged eccentrically with respect to the axis of rotation, and which rotary shaper comprises at least one stationary handling means (10B), in which case the material to be handled is conducted;
   varying the direction of rotation of the rotatable handling means (10A, 10C);
   changing the direction of rotation of the handling means (10A, 10C) on the basis of time and/or the loading of a drive device (7A, 7C) of the handling means;
   conducting the waste material into the rotary shaper and/or through the rotary shaper at least partly by means of gravity, wherein the material to be handled is conducted into the rotary shaper and/or through the rotary shaper at least partly by means of suction and/or a pressure difference.

2. The method according to claim 1, wherein each rotatable handling means (10A, 10C) is driven with its own drive device (7A, 7C).

3. The method according to claim 1, wherein at least a part of the handling means (10A, 10C) of the rotary shaper when rotating feeds the material to be handled through the handling means, at least when rotating in a first direction.

4. The method according to claim 1, wherein the rotatable handling means (10A, 10C) shapes the material, together with at least one other preferably non-moving handling means (10B).

5. The method according to claim 1, wherein in the direction of travel of the material to be handled the cross-sectional area of the material flow passing through the handling means (10A, 10B, 10C) of the rotary shaper is decreased such that the material can be conducted into the material transfer pipe (4, 5) disposed after the rotary shaper.

6. The method according to claim 1, wherein the direction of rotation of the rotatable handling means (10A, 10C) can be varied.

7. The method according to claim 1, wherein the rotatable handling means (10A, 10C) are rotated at different speeds with respect to each other.

8. The method according to claim 1, wherein the rotatable handling means (10C) farther on in the direction of travel of the material to be handled is rotated more slowly than at least one handling means (10A) preceding it in the direction of travel of the material.

9. The method according to claim 1, wherein the drive device (7A, 7C) of a rotatable handling means is an electric motor, a pneumatic motor or a hydraulic motor.

10. The method according to claim 1, wherein the pneumatic materials handling system is a pipe transport system of material transporting waste material.

11. The method according to claim 1, wherein the direction of rotation of the handling means (10A, 10C) is changed on the basis of time and/or the loading, i.e. output power, of the drive device (7A, 7C) of a handling means.

12. The method according to claim 1, wherein the rotatable handling means (10A, 10C) are driven in sequences, in which case the handling means (10A, 10C) are rotated in a first direction for a first period of time ($t_1$) and after that in the opposite direction for a second period of time ($t_2$).

13. The method according to claim 12, wherein the first time ($t_1$) is greater than the second time ($t_2$), preferably the second time ($t_2$)≤0.5x the first time ($t_1$).

14. The method according to claim 1, wherein the material is removed from the transfer pipe (4, 5) that is in the proximity of the rotary shaper and a replacement air valve is preferably kept open at least when the rotatable handling means (10A, 10C) are rotated in a second direction.

15. The method according to claim 1, wherein at least one blade part (14A, 14C), more particularly a replaceable blade part, is arranged in a rotatable handling means (10A, 10C), which blade part is adapted to act on the material when the handling means is rotated in a second direction.

16. The method according to claim 1, wherein the drive devices (7A, 7C) are hydraulic motors, which are connected in series.

17. Apparatus for handling material in a pneumatic materials handling system, comprising:
at least one input point of a refuse chute (3);
a transfer piping (4, 5) operatively connected to the refuse chute (3) wherein said material is conveyed along the transfer piping (4, 5);
a shaper device (1), arranged in connection with the input point or in the proximity to the input point, said shaper device being a rotary shaper (1, 100); and
a handling means (10A, 10B, 10C) including a rotatable handling means (10A, 10C) which includes an aperture (11A, 11B, 11C) arranged eccentrically with respect to the axis of rotation of the rotatable handling means, and a stationary handling means (10B);
wherein the direction of rotation of the rotatable handling means (10A, 10C) is adapted to be varied and the direction of rotation of the handling means (10A, 10C) is adapted to be changed on the basis of time and/or the loading of a drive device (7A, 7C) of the handling means;
wherein the material to be handled is adapted to be conducted into the rotary shaper and through the rotary shaper at least partly by means of gravity, and wherein the material to be handled is adapted to be conducted into the rotary shaper and through the rotary shaper at least partly by suction and/or a pressure difference.

18. The apparatus according to claim 17, wherein the apparatus comprises a plurality of drive devices (7A, 7C) for the rotatable handling means (10A, 10C) wherein a plurality of rotatable handling means (10A, 10C) are each provided with a separate drive device (7A, 7C).

19. The apparatus according to claim 17, wherein at least a part of the rotatable handling means (10A, 10B, 10C) of the rotary shaper comprise surface patterning formed as a thread section, that feeds material wherein the surface patterning is adapted when the rotatable handling means (10A, 10C) is rotated in at least a first direction to transfer the material to be handled through a compression phase formed by the rotatable handling means of a rotary press.

20. The apparatus according to claim 17, wherein in the direction of travel of the material a cross-sectional area of a material pathway (11A, 11B, 11C) passing through the rotatable handling means (10A, 10B, 10C) of the rotary shaper decreases in the direction of travel of the material.

21. The apparatus according to claim 18, wherein the plurality of drive devices (7A, 7C) are adapted to rotate the rotatable handling means (10A, 10C) at different speeds with respect to each other.

22. The apparatus according to claim 18, wherein the rotatable handling means (10C) farther on in the direction of travel of the material to be handled is adapted to be rotated with the drive device (7C) more slowly than at least one rotatable handling means (10A) preceding it in the direction of travel of the material with one of the separate drive devices (7A).

23. The apparatus according to claim 18, wherein the drive devices (7A, 7C) of the rotatable handling means (10A, 10C) have a different output power or torque or speed of rotation relative to each other.

24. The apparatus according to claim 17, wherein an output aperture (37) of the rotary shaper is at least partly smaller than a flow aperture of the transfer piping (4, 5) following it in the material transfer direction.

25. The apparatus according to claim 17, wherein an output aperture (37) of the rotary shaper is at least partly larger than a free pathway through the handling means (10A, 10B, 10C), said output aperture being selected from the group consisting of an oval shape and an elliptical shape.

26. The apparatus according to claim 17, wherein at least one blade part (14A, 14C), being a replaceable blade part, is arranged in the rotatable handling means (10A, 10C), which blade part transfers the material when the handling means is rotated in a second direction.

27. The apparatus according to claim 18, wherein the plurality of drive devices (7A, 7C), operatively connected to the rotatable handling means (10A, 10B), are hydraulic motors, which are connected in series.

28. Apparatus for handling material in a pneumatic materials handling system, comprising:
at least one input point of a refuse chute (3);
a transfer piping (4, 5) operatively connected to the refuse chute (3) wherein said material is conveyed along the transfer piping (4, 5);
a shaper device (1), arranged in connection with the input point or in the proximity to the input point, said shaper device being a rotary shaper (1, 100);
a handling means (10A, 10B, 10C) including a rotatable handling means (10A, 10C) which includes an aperture (11A, 11B, 11C) arranged eccentrically with respect to the axis of rotation of the rotatable handling means, and a stationary handling means (10B); and
at least a part of the rotatable handling means (10A, 10B, 10C) of the rotary shaper comprise surface patterning formed as a thread section, that feeds material wherein the surface patterning is adapted when the rotatable handling means (10A, 10C) is rotated in at least a first direction to transfer the material to be handled through a compression phase formed by the rotatable handling means of a rotary press;
wherein the material to be handled is adapted to be conducted into the rotary shaper and through the rotary shaper at least partly by means of gravity, and wherein the material to be handled is adapted to be conducted into the rotary shaper and through the rotary shaper at least partly by suction and/or a pressure difference.

29. Apparatus for handling material in a pneumatic materials handling system, comprising:
at least one input point of a refuse chute (3);
a transfer piping (4, 5) operatively connected to the refuse chute (3) wherein said material is conveyed along the transfer piping (4, 5);

a shaper device (1), arranged in connection with the input point or in the proximity to the input point, said shaper device being a rotary shaper (1, 100); and a handling means (10A, 10B, 10C) being a rotatable handling means (10A, 10C) which includes an aperture (11A, 11B, 11C) arranged eccentrically with respect to the axis of rotation of the rotatable handling means, and a stationary handling means (10B);

wherein the direction of rotation of the rotatable handling means (10A, 10C) is adapted to be varied and the direction of rotation of the handling means (10A 10C) is adapted to be changed on the basis of time and/or the loading of a drive device (7A, 7C) of the handling means;

an output aperture (37) of the rotary shaper is at least partly larger than a free pathway through the handling means (10A, 10B, 10C), said output aperture being selected from the group consisting of an oval shape and an elliptical shape;

wherein the material to be handled is adapted to be conducted into the rotary shaper and through the rotary shaper at least partly by means of gravity, and wherein the material to be handled is adapted to be conducted into the rotary shaper and through the rotary shaper at least partly by suction and/or a pressure difference.

* * * * *